June 18, 1946.  R. E. MARTIN  2,402,201
FRUIT GATHERER
Filed Feb. 13, 1943   5 Sheets-Sheet 1

June 18, 1946.   R. E. MARTIN   2,402,201
FRUIT GATHERER
Filed Feb. 13, 1943   5 Sheets-Sheet 3

Inventor
Robert E. Martin

By Clarence A. O'Brien
and Harvey B. Jacobson
Attorneys

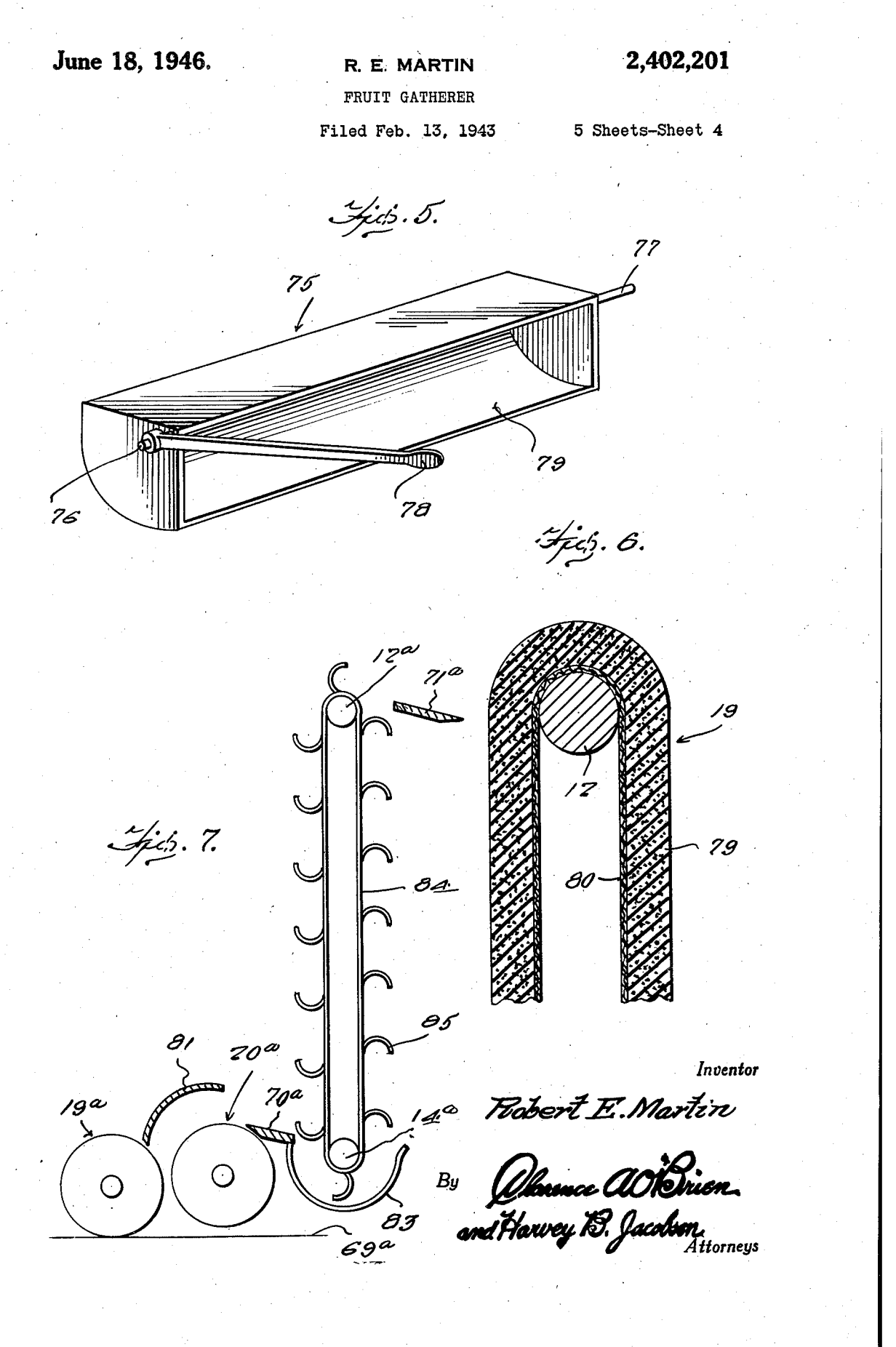

June 18, 1946.   R. E. MARTIN   2,402,201
FRUIT GATHERER
Filed Feb. 13, 1943   5 Sheets-Sheet 5
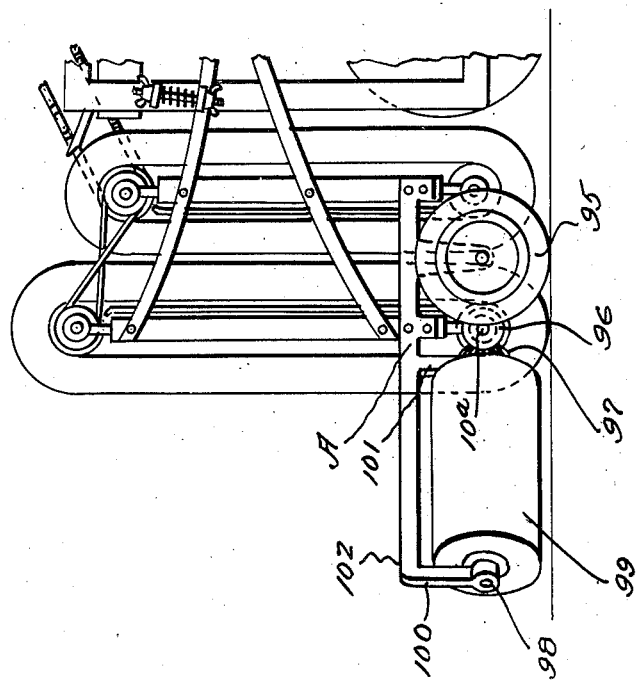
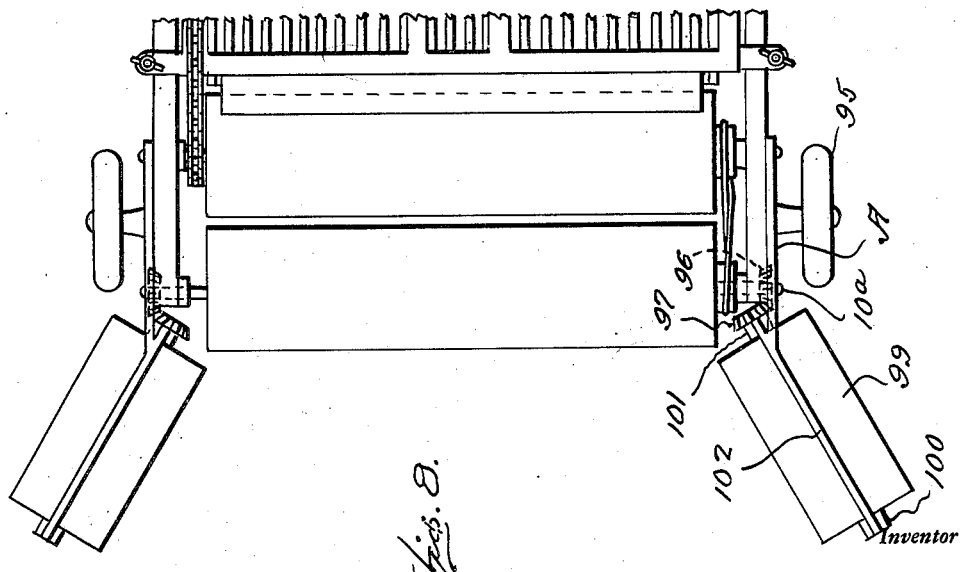
Inventor
Robert E. Martin
By Clarence A. O'Brien
and Harvey B. Jacobson
Attorneys

Patented June 18, 1946

2,402,201

UNITED STATES PATENT OFFICE 2,402,201

FRUIT GATHERER

Robert E. Martin, San Jose, Calif.

Application February 13, 1943, Serial No. 475,847

9 Claims. (Cl. 56—328)

My invention relates to improvements in means for gathering and picking up fruits and nuts which have fallen on the ground, and grading the picked up objects according to size, and an important object of my invention is to provide a simple and efficient arrangement of this character which can be provided in simple and low cost construction, and is operable with a minimum of effort and expense.

Another important object of my invention is to provide in an arrangement of the character indicated above, improved arrangements of pick up devices, whereby the fruits or nuts or the like are gathered and picked up from the ground and elevated to a desired height with greater efficiency and with less danger of damaging the fruit, nuts or the like.

Other important objects and advantages of my invention will be apparent from a reading of the following description taken in connection with the drawings, wherein for purposes of illustration I have shown preferred embodiments of my invention.

In the drawings—

Figure 5 is a perspective view of the receiver.

Figure 6 is an enlarged transverse vertical sectional view taken through one of the endless belts of the pick up unit shown in Figure 1.

Figure 7 is a sectional elevational schematic view of a modified form of pick up unit.

Figure 8 is a fragmentary side elevational view showing a modification of the invention.

Figure 9 is a fragmentary top plan view showing the modified portion of the invention.

Figure 1:
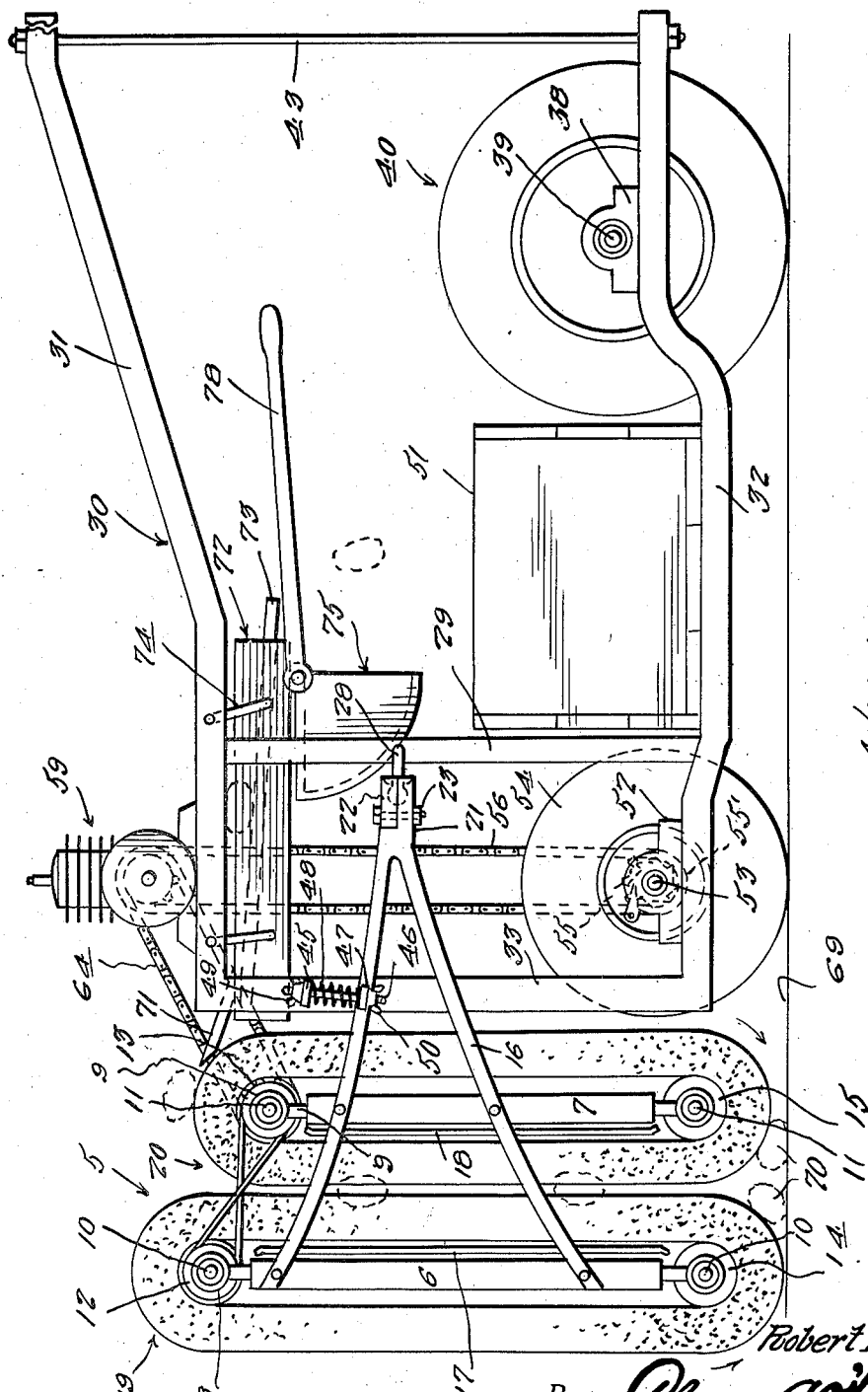
Figure 1 is a general side elevational view of the preferred embodiment showing the receiver in normal inoperative position to deposit the graded fruit or nuts in the removable receptacle.
Figure 2:
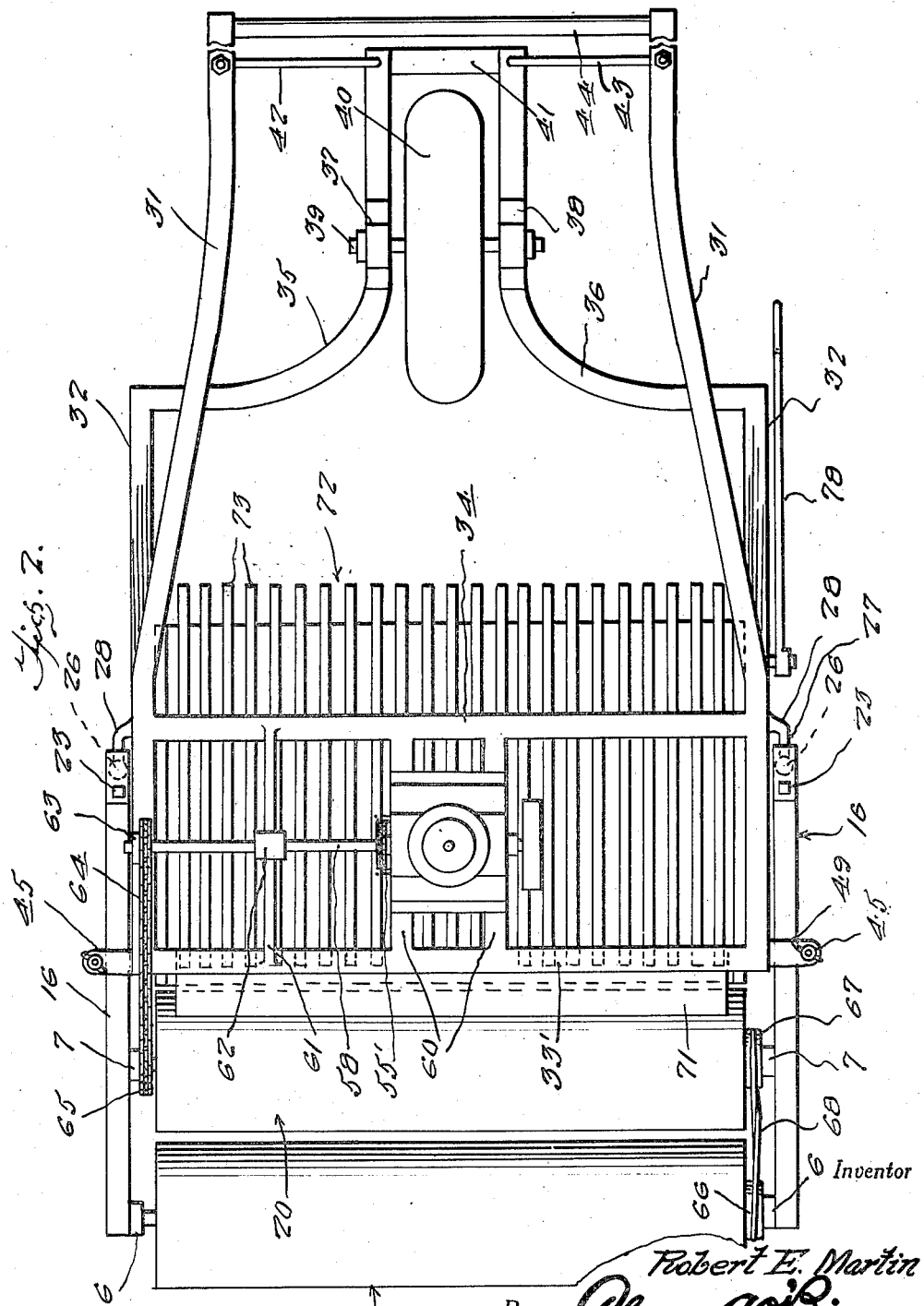
Figure 2 is a top plan view of Figure 1.
Figure 3:
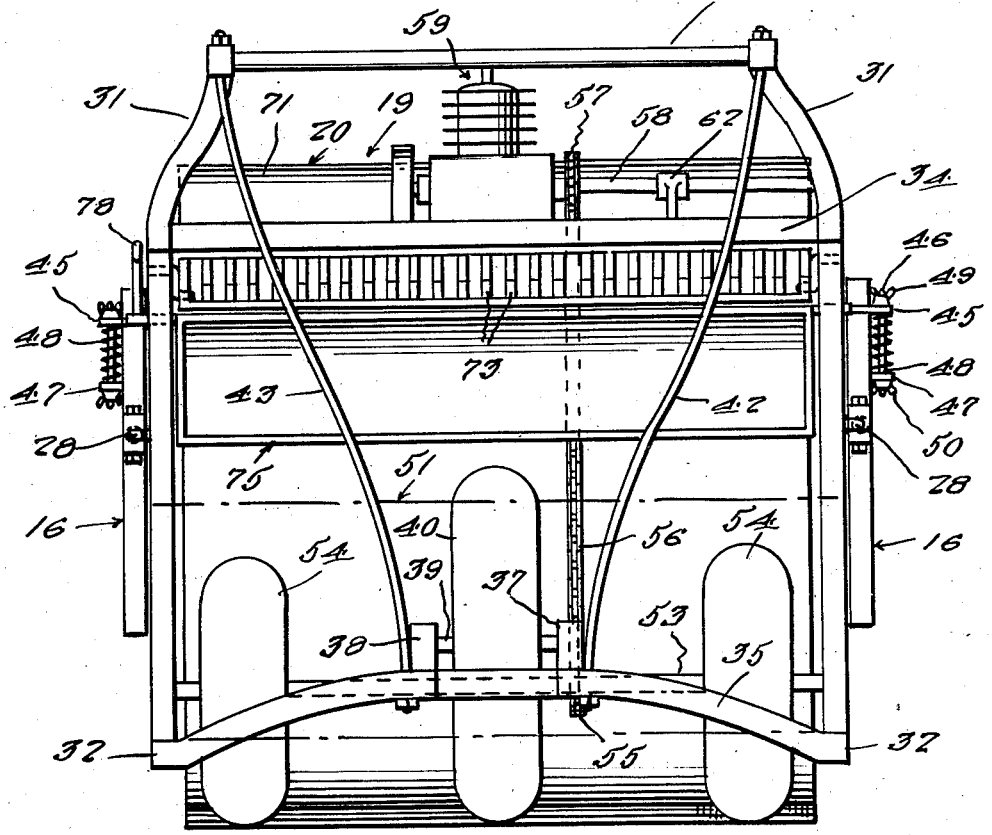
Figure 3 is a right hand end elevational view of Figure 1.
Figure 4:
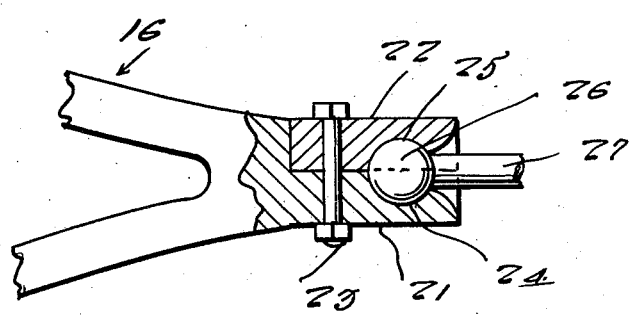
Figure 4 is an enlarged sectional elevational view of one of the rear terminals of the pick up unit supports and showing the connection thereof to a stationary member on the main frame.

Referring in detail to the drawings, the numeral 5 generally designates the pick up unit of the embodiment of the invention shown in Figures 1 through 6, the said pick up unit comprising a pair of substantially parallel vertically arranged and transversely aligned support elements 6, a second similarly arranged pair of support elements 7, the upper and lower ends of the various support elements being provided with bearings 8 in the case of the support elements 6 and 9 in the case of the support elements 7 to rotatably support horizontal shafts 10 and 11, respectively, on which the upper rollers 12 and 13, and the lower rollers 14 and 15, are supported. The companion vertical elements 6 and 7 on opposite sides of the device are spaced and connected by reclining V-shaped frames 16 which are attached to the outer sides of the elements 6 and 7 as indicated in Figures 1 and 2. Also attached to the legs of the V-shaped frames are tables 17 and 18, respectively, which extend vertically substantially between the upper and lower rollers of each set and substantially entirely across between the frames 16 to act as means to be engaged by the corresponding flights of the related endless belts 19 and 20.

The junction of the legs of the V-shaped frames 16 terminate in a lug 21 which is cut away at its top to receive the replaceable member 22 which is ordinarily locked in place by means of the bolt 23, the upper surface of the cut away portion having a hemispherical concavity 24 and the lower side of the removable member 22 having a substantially matching concavity 25 whereby a ball socket is provided to receive and removably hold the ball 26 on the forwardly extending horizontal portion 27 of the laterally extending arm 28 which is fixed on the intermediate vertical member 29 on each side of the main frame which is generally designated 30, whereby the pick up unit 5 is supportably connected to the main frame 30 and at the same time permitted relative up and down motion to enable the pick up unit to conform to the contour of the ground over which the gatherer is operated for gathering fruits or nuts and the like.

The main frame comprises, besides the intermediate vertical members 29, sides made up of the upper and lower longitudinal members 31 and 32, joined at their forward ends by the front vertical member 33, with the upper and lower ends of the members 29 connected respectively with the upper and lower longitudinal members 31 and 32, transverse members 33' and 34 extending between the pairs of upper and lower longitudinal members at the junction points of the vertical members 29 and 33 as is made evident in Figure 2 of the drawings.

As indicated in Figure 2 of the drawings the lower longitudinal side members 32 are deformed laterally inwardly to provide substantially J-shaped portions 35 and 36, respectively, which have bearings 37 and 38, respectively, mounted thereupon and journalling the axle 39 on which the pneumatic tired ground engaging wheel 40 is mounted. The rear terminals of the portions 35 and 36 are spaced and connected by a transverse member 41 and from these rear ends of these portions rise rods 42 and 43, respectively, which pass through and are connected with the rear terminals of the upper longitudinal side members 31 which, as shown in Figure 2, converge rearwardly and have connected therebetween the handle bar 44 for use by the operator of the device in guiding the same over the ground.

Rigidly fixed lugs 45 on the opposite vertical members 33 of the main frame are traversed by bolts 46 which also traverse the rigid lug 47 on one of the arms of the V-shaped frames 16 of the pick up unit. An expanding spring 48 is interposed between the said lugs and circumposed on the bolt 46 so that elevation of the pick up unit is yieldably resisted by the spring 44 and the unit urged toward conforming engagement with the surface of the ground. Adjusting wing nuts 49 and 50 are threaded on the upper and lower ends of the said bolt to provide for adjustment of the tension of the spring and of the initial angularity of the pick up unit relative to the horizontal. The portion of the longitudinal side members 32 forwardly of the inwardly directed portions 35 and 36 provide support for a removable box or receptacle 51 which as shown in Figure 1 is positioned just to the rear of the vertical members 29. Forward portions of the said lower longitudinal side members 32 have bearings 52 secured thereupon to journal the axle 53 on which the laterally spaced pneumatic tired ground engaging wheels 54 are mounted with ratchet connections 55 arranged to connect the ground engaging wheels 54 and the axle 53 against relative rotation in one direction while permitting relative rotation in the opposite direction. The purpose of this arrangement is to provide for differential action of the ground engaging wheels 54 to facilitate turning the gatherer. A sprocket wheel 55' is fixed on an intermediate part of the axle 53 and over this is trained a sprocket chain 56 which is trained over the sprocket wheel 57 on the motor shaft 58 of the internal combustion or other suitable type of engine 59 which is mounted on cross members 60 extending between the upper transverse cross members 33' and 34 of the main frame 30 as clearly shown in Figure 2. An additional cross member 61 has a bearing 62 supporting an intermediate part of the shaft 58 which has on its laterally outward end a sprocket 63 which has trained thereon a sprocket chain 64 which is also trained on the sprocket 65 on the shaft of the upper roller 13, whereby the upper roller and the axle 53 and consequently the ground engaging wheels 54 are driven at a coordinated rate of speed for producing simultaneous forward travel of the gatherer over the ground accompanied by operation of the pick up unit as a consequence of rotation of the roller 13.

At the side of the pick up unit opposite the sprocket chain 64 the upper rollers 12 and 13 are provided with pulleys 66 and 67, respectively, over which is trained a reversed belt 68 which produces rotation of these rollers in opposite directions.

The rollers 12 and 14 are spaced at a greater distance relative to each other than the upper and lower rollers 13 and 15, and the lower roller 14 approaches the ground more closely than does the lower roller 15, and the upper roller 12 rises above the upper roller 13. As a consequence, the endless belt 19 on the rollers 12 and 14 engages the ground 69 in advance of the belt 20 and maintains substantially constant contact with the ground whereas the lower part of the belt 20 is substantially constantly elevated above or at least in imperfect contact with the ground 69. The belt 19 travels in a counter-clockwise direction as seen in Figure 1, while the endless belt 20 travels in a clockwise direction.

Each of the said belts is composed of a thick sponge rubber endless body or loop reinforced at its inner side so as to be non-stretchable. As the gatherer moves over the ground 69 with the lower end of the forward belt 19 contacting the ground, and prunes or nuts or other such fruit being encountered by the forward belt 19, the said nuts or the like are moved outwardly to the rear and into contact with the lower end of the rear belt 20, so that the nuts or the like 70 are carried upwardly between the opposed flights of the belts 19 and 20 as clearly indicated in Figure 1 of the drawings, with opposite sides of the nuts or the like embedded in the soft sponge rubber or other similarly suitable material of the belts whereby to be non-injuriously but firmly held and elevated. The tables 17 and 18 mentioned hereinabove, prevent the opposed flights of the belts from being pushed out of effective operative positions by large nuts or the like. The upper end of the rear belt 20 being depressed below the upper end of the forward belt 19, and with the belts traveling in the directions stated, the tendency of the nuts or the like 70 is, upon reaching the upper end of the belt 20 to be thrown or carried rearwardly by the upper part of the belt 20 and moved onto the declining receiving table 71 which is supported below the upper cross member 33' of the main frame and empty into the grader tray which is generally designated 72 and which is provided with grading partitions 73 arranged longitudinally of the main frame, the tray being suspended on depending swingable links 74 whereby the tray may be manually agitated to assist in the grading of the fruit, nuts or the like deposited thereon from the receiving table 71.

Pivotally supported on the underside of the rearward part of the grading tray 72 is the segmental cross section receiver which is generally designated 75 and which has pivot lugs 76 and 77 projecting from opposite ends thereof and aligned with the meeting point of the straight sides of the receiver, the lug 76 being provided with a rigidly connecting lever 78 whereby the receiver is normally gravitationally over-balanced so as to occupy the out-of-the-way position shown in Figure 1 of the drawings during normal operation of the device.

When it is desired to change receptacles 51 and in so doing to prevent the contents of the grading tray from falling onto the ground, the handle 78 may be swung upwardly by the operator of the device so as to bring the opening 79 of the receiver into position under the discharge end of the tray 72 and accept the nuts or the like discharged from the tray, during the interim when the box or receptacle 51 is being changed.

As shown in Figure 6 of the drawings, the endless belts such as the endless belt 19 used for illustration, is formed of a relatively thick body of sponge rubber designated by the numeral 79, the said body being lined on its inner side with a non-stretchable ply 80 which prevents the soft sponge rubber from spreading and stretching and impairing the mechanical efficiency of the belts and the upper and lower rollers.

Referring now to the modified form of pick-up unit shown in Figure 7, this involves substitution for the endless belts of sponge rubber of the sponge rubber rollers 19a and 20a, respectively, the rear rollers 20a being elevated so as to be normally in imperfect engagement with the ground 69a or elevated thereabove. In this case, a curved deflector or baffle 81 is provided over the space between the rollers to guide the nuts or the like picked up by the rollers and elevated therebetween to follow a course over the top of the rear roller 20a and become deposited on the receiving board or table 70a upon which the gathered nuts or the like fall into the trough 83 into which extends the lower end of a vertically arranged endless conveyor 84 which is supported on upper and lower rollers 12a and 14a, scoops 85 being distributed along the conveyor to properly lift the gathered nuts or the like for discharge onto the receiving table 71a corresponding to the receiving table 71 in the first described embodiment.

In order to gather fruits, nuts and other items over a path wider than the machine, a modification of the structure herein described is proposed and clearly shown in Figures 8 and 9. In this connection, each side of the frame has a forwardly projecting supplemental frame A suitably secured in place and provided with stub shafts for accommodating ground engageable wheels 95. A shaft 10a, which corresponds to the shaft 10 in Figure 1 has a bevel gear 96 thereon, at each end thereof for meshing engagement with beveled gears 97 on shafts 98, each shaft 98 having suitably secured thereon a cushion roll 99 made preferably of sponge rubber. Bearing members 100 and 101 depend from obliquely disposed extensions 102 of each auxiliary frame A, for the purpose of supporting the corresponding shaft 98 and the corresponding roll 99 just above the ground level.

Thus it can be seen, that with the rolls 99 diverging from the forward portion of the machine, a wider path can be cleared than with the webs disclosed in Figure 1.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A gatherer for nuts or the like lying on the ground, said gatherer comprising a main frame having ground engaging wheels, and a pick up unit connected to the forward part of said main frame, a motor mounted on said main frame in driving relation to some of said wheels, said pick up unit comprising gathering and elevating elements having rotary operating members in driven relation to said motor, said gathering elements including two vertically-coacting members, said gathering and elevating elements comprising endless compressible material belts having flight portions thereof arranged in parallelism, said belts being trained over said rotary operating members and depending for close approach to the ground, said belts being moved in opposite directions to feed the nuts from the ground to be held and elevated between said flight portions of the belts, and means for receiving the elevated nuts or the like as they roll off the upper end of one of said belts.

2. A gatherer for nuts or the like lying on the ground, said gatherer comprising a main frame having ground engaging wheels, and a pick up unit connected to the forward part of said main frame, a motor mounted on said main frame in driving relation to some of said wheels, said pick up unit comprising gathering and elevating elements having rotary operating members in driven relation to said motor, said gathering elements including two vertically-coacting members, said gathering and elevating elements comprising endless compressible material belts having flight portions thereof arranged in parallelism, said belts being trained over said rotary operating members and depending for close approach to the ground, said belts being moved in opposite directions to feed the nuts from the ground to be held and elevated between said flight portions of the belts, and means for receiving the elevated nuts or the like as they roll off the upper end of one of said belts, said receiving means comprising a table and a grading tray into which said table empties.

3. A gatherer for nuts or the like lying on the ground, said gatherer comprising a main frame having ground engaging wheels, and a pick up unit connected to the forward part of said main frame, a motor mounted on said main frame in driving relation to some of said wheels, said pick up unit comprising gathering and elevating elements having rotary operating members in driven relation to said motor, said gathering elements including two vertically-coacting members, said gathering and elevating elements comprising endless compressible material belts having flight portions thereof arranged in parallelism, said belts being trained over said rotary operating members and depending for close approach to the ground, said belts being moved in opposite directions to feed the nuts from the ground to be held and elevated between said flight portions of the belts, and means for receiving the elevated nuts or the like as they roll off the upper end of one of said belts, said receiving means comprising a table and a grading tray into which said table empties, and a receptacle removably supported on said main frame to receive the graded nuts or the like from said grader.

4. A pick up unit for gatherer of the character described, said pick up unit comprising a forward set of transversely aligned upper and lower substantially horizontal rollers, a rearward set of transversely aligned upper and lower substantially horizontal rollers, means connecting the upper rollers of the sets for rotation in opposite directions, a first compressible endless belt trained over the upper and lower rollers of the first set, a second compressible endless belt trained over the upper and lower rollers of the second set, with one vertical flight thereof closely spaced relative to the adjacent vertical flight of the first belt, the lower end of said first belt being arranged to engage the ground in front of said second belt to move the nuts toward and into engagement with the lower end of the second belt whereby the nuts are deposited between and carried upwardly by and between said vertical flights.

5. A pick up unit for gatherer of the character described, said pick up unit comprising a forward set of transversely aligned upper and lower substantially horizontal rollers, a rearward set of transversely aligned upper and lower substantially horizontal rollers, means connecting the upper rollers of the sets for rotation in opposite directions, a first compressible endless belt trained over the upper and lower rollers of the first set, a second compressible endless belt trained over the upper and lower rollers of the second set, with one vertical flight thereof closely spaced relative to the adjacent vertical flight of the first belt, the lower end of said first belt being arranged to engage the ground in front of said second belt to move the nuts toward and into engagement with the lower end of the second belt wheereby the nuts are deposited between and carried upwardly by and between said vertical flights, the lower end of said second belt being normally closely spaced above the ground and having its upper end depressed below the upper end of the first belt to provide for rearward movement of the elevated nuts over the upper end of said second belt.

6. A pick up unit for gatherer of the character described, said pick up unit comprising a forward set of transversely aligned upper and lower substantially horizontal rollers, a rearward set of transversely aligned upper and lower substantially horizontal rollers, means connecting the upper rollers of the sets for rotation in opposite directions, a first compressible endless belt trained over the upper and lower rollers of the first set, a second compressible endless belt trained over the upper and lower rollers of the second set, with one vertical flight thereof closely spaced relative to the adjacent vertical flight of the first belt, the lower end of said first belt being arranged to engage the ground in front of said second belt to move the nuts toward and into engagement with the lower end of the second belt whereby the nuts are deposited between and carried upwardly by and btween said vertical flights, and supports on opposite sides of said unit spacing and connecting said sets of the upper and lower rollers thereof.

7. A pick up unit for gatherer of the character described, said pick up unit comprising a forward set of transversely aligned upper and lower substantially horizontal rollers, a rearward set of transversely aligned upper and lower substantially horizontal rollers, means connecting the upper rollers of the sets for rotation in opposite directions, a first compressible endless belt trained over the upper and lower rollers of the first set, a second compressible endless belt trained over the upper and lower rollers of the second set, with one vertical flight thereof closely spaced relative to the adajcent vertical flight of the first belt, the lower end of said first belt being arranged to engage the ground in front of said second belt to move the nuts toward and into engagement with the lower end of the second belt whereby the nuts are deposited between and carried upwardly by and between said vertical flights, and supports on opposite sides of said unit spacing and connecting said sets of the upper and lower rollers thereof, and a main frame having ground engaging wheels and means pivoting said supports to said main frame for swinging on a horizontal axis.

8. A pick up unit for gatherer of the character described, said pick up unit comprising a forward set of transversely aligned upper and lower substantially horizontal rollers, a rearward set of transversely aligned upper and lower substantially horizontal rollers, means connecting the upper rollers of the sets for rotation in opposite directions, a first compressible endless belt trained over the upper and lower rollers of the first set, a second compressible endless belt trained over the upper and lower rollers of the second set, with one vertical flight thereof closely spaced relative to the adjacent vertical flight of the first belt, the lower end of said first belt being arranged to engage the ground in front of said second belt to move the nuts toward and into engagement with the lower end of the second belt whereby the nuts are deposited between and carried upwardly by and between said vertical flights, and supports on opposite sides of said unit spacing and connecting said sets of the upper and lower rollers thereof, and a main frame having ground engaging wheels and means pivoting said supports to said main frame for swinging on a horizontal axis, and motor means on said main frame in driving relation to said belts.

9. A gatherer for nuts or the like lying on the ground, said gatherer comprising a main frame having ground engaging wheels, and a pick up unit connected to the forward part of said main frame, a motor mounted on said main frame in driving relation to some of said wheels, said pick up unit comprising gathering and elevating elements having rotary operating members in driven relation to said motor, said gathering and elevating elements comprising a cooperating pair of compressible rollers, a trough behind these rollers to receive the nuts as they roll from one of these rollers, and a vertical conveyor reaching into said trough for elevating the nuts from said trough.

ROBERT E. MARTIN.